Feb. 19, 1957 P. U. BOCKRATH ET AL 2,781,839
WEB SLITTING APPARATUS
Filed Oct. 2, 1953
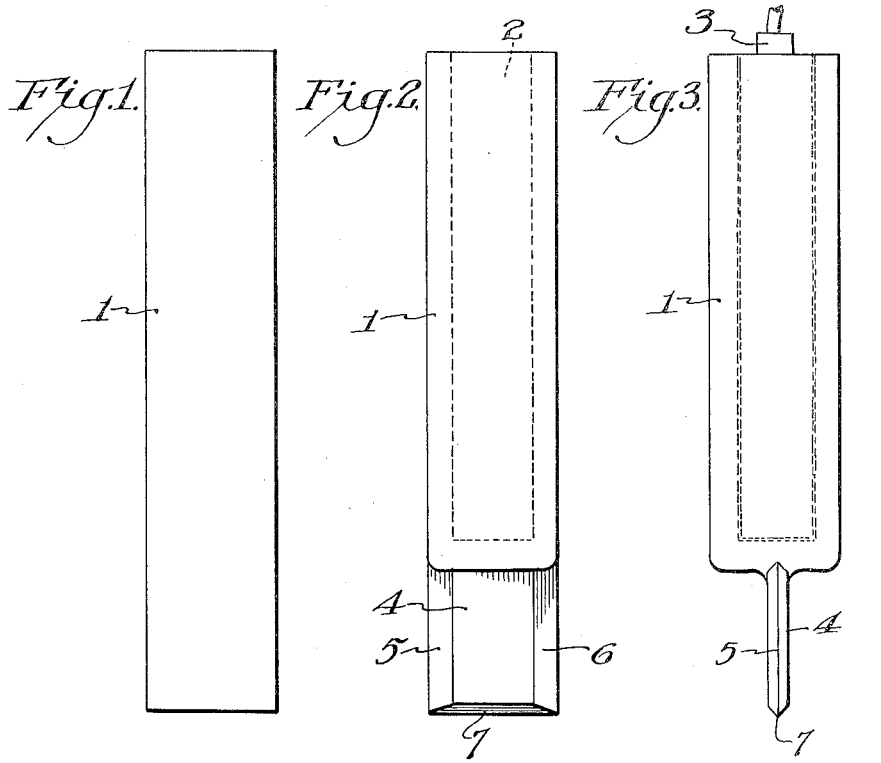
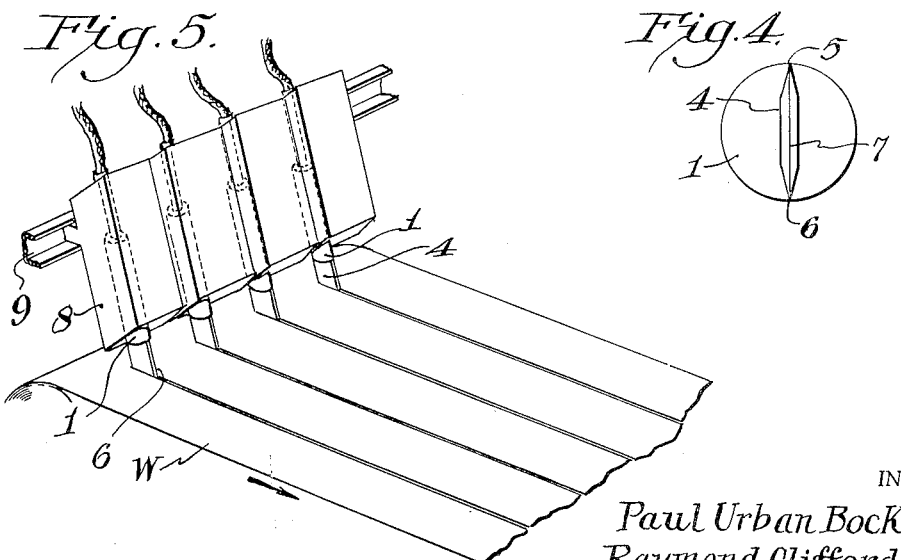
INVENTOR
Paul Urban Bockrath
Raymond Clifford Dill
BY
ATTORNEY United States Patent Office 2,781,839
Patented Feb. 19, 1957

2,781,839

WEB SLITTING APPARATUS

Paul Urban Bockrath, Kenmore, and Raymond Clifford Dill, Tonawanda, N. Y., assignors to E. I. du Pont de Nemours & Company, Wilmington, Del., a corporation of Delaware Application October 2, 1953, Serial No. 383,744

4 Claims. (Cl. 164—36)

This invention relates to an apparatus for slitting or slitting and fusing the slit edges of single or superimposed webs of continuous thermoplastic materials and, more particularly, to an integral hot knife unit for slitting and fusing the slit edges of continuous thermoplastic webs.

In the continuous slitting of continuous webs of thermoplastic fabrics into continuous widths, narrower than the original width of the web, it is preferable not only to produce a clean even edge but also to fuse the slit edges of a fabric, woven or non-woven, in order that the edges will not ravel during conversion of the fabric into finished articles. Similarly, continuous lengths of tubing may be fabricated from flat sheets or films of various thermoplastic polymers by superimposing two or more continuous webs of these sheets or films, and thereafter passing the superimposed films through a multiplicity of hot knife edges which slit the superimposed films into lengths and, at the same time, seal the severed edges together to form continuous lengths of tubing having two longitudinal seams. In carrying out such simultaneous slitting and fusing operations, it is necessary to employ hot cutting edges which must be maintained at a uniform elevated temperature. Furthermore, in order that relatively narrow strips of fabric may be cut from a web, or in order to form relatively narrow tubing, it is necessary that the hot knife units be relatively small in size and compact.

Hot knife units employed heretofore have generally been fabricated from a multiplicity of parts essentially consisting of a knife blade, for example, a razor blade, a housing into which the blade is inserted, and a source of heat, for example, an electrical heating coil, which is inserted into the housing and serves to heat the cutting blade to an elevated temperature. Aside from the structural complications of such units, an added disadvantage resides in the difficulty of efficiently heating and maintaining the inserted blades at uniform elevated temperatures for extended periods of operation.

An object of the present invention is to provide a hot knife unit which is integral except for the heat source. A further object of the present invention is to provide a hot knife unit which is fabricated from a solid piece of metal. A still further object is to provide a hot knife unit which is small and compact. A further object of the present invention is to provide a hot knife unit wherein heat transfer to the blade is efficiently realized and the cutting blade may be maintained at a uniform elevated temperature for extended periods of operation. Other objects will be apparent from the description of the invention given hereinafter.

The above objects are accomplished in accordance with the present invention by providing an integral knife unit fabricated from a solid elongated piece of metal, said knife unit comprising a body portion having an elongated concentric well formed therein and open at one end thereof, and an integral blade portion, fashioned as hereinafter described, at the end opposite to the opening of the concentric well in the body portion, said well providing for insertion therein of a source of heat such as an electrical resistance-type heating unit.

The present invention is premised on the discovery that maximum efficient heat transfer from a standard source of heat, such as a heating unit of the electrical resistance-type, is obtained when the heat source is employed in conjunction with an integral knife or slitting unit. In other words, the knife body into which the heating unit is inserted and the cutting blade of the knife are all one piece. Such construction provides for efficient and uniform heat transfer from the knife body into the cutting blade. Furthermore, the use of such an integrated unit makes it possible to maintain the knife blade, and, more specifically, the cutting edges thereof, at a uniform elevated temperature for extended periods of operation. Substantially all of the heat from the body of the knife unit is transferred to the blade by conduction, and little heat radiates from the body of the knife to the web being cut. This feature is important, particularly in slitting thermoplastic webs, for the reason that the surfaces of the web are not overheated in local areas adjacent to the line along which slitting is effected. In general, in similar types of hot knife units which are fabricated from a multiplicity of individual components, the efficiency of heat transfer from the heat source to the cutting blade is reduced in proportion to the number of individual components in such composite units. Under conditions involving a given power input to an electrical resistance heat source, the integral hot knife units of the present invention are capable of maintaining a uniform blade temperature which is higher than that of any other type of composite hot knife units employed heretofore in slitting-fusing operations.

The apparatus of the present invention may be more clearly understood from the following description which is to be read with reference to the accompanying drawings wherein:

Figure 1 is a side view of a piece of a solid metal rod from which the unitary knife structure is fabricated;

Figure 2 is a side view of the same solid metal rod after a concentric well has been drilled in the center thereof to form a body portion, and a triple edge blade has been machined at an end opposite to the opening of the well;

Figure 3 is a side view of the same hot knife unit shown in Figure 2 except that it has been rotated 90° to show the configuration of the blade. Figure 3 further illustrates the relative position of a "Chromolox" cartridge heating unit which has been inserted into the well in the body portion of the integral hot knife unit;

Figure 4 is a bottom view of the unit; and

Figure 5 is a schematic drawing showing a multiplicity of the hot knife units of the present invention employed for continuously slitting and sealing superimposed lengths of thermoplastic film to form double seam tubing.

Referring to Figure 1, the hot knife unit is fabricated from metal rod stock 1, preferably from aluminum rod stock of circular cross-section having, for example, a diameter of 1 inch and a length of 5 inches. As shown in Figures 2, 3 and 4, this rod is drilled from one end to provide a well 2, sized to snugly receive a suitable electrical resistance heating unit 3 such as the "Chromolox" cartridge heater, which is essentially a cylindrical brass casing 3¾ inches long and ⅝ inch in diameter housing a coil of resistance wire (115 volts, 240 watts). The opposite end of the rod is machined or ground to form a thin blade 4 having two side cutting edges 5 and 6, and a bottom cutting edge 7. Although it is preferred to have the three edges of the hot blade sharpened, only one edge need be sharpened for efficient operation. It is convenient to have the bottom edge sharpened so that it can easily pierce the film when beginning an operation. A second cutting edge provides for longer knife life.

The numerous advantages of the present unitary device are realized to best advantage when employing a multiplicity of these units for continuously slitting a continuous web of thermoplastic material into longitudinal strips, or in fabricating a multiplicity of narrow width tubing from superimposed thermoplastic films, e. g., polyethylene terephthalate film, as illustrated in Figure 5. In operation, the knife blade may be fixed at any angle to the horizontal plane in which the films or fabrics are moving. Figure 5 shows each knife blade mounted in a thermo-insulating holder 8 which, in turn, is removably mounted on a rack 9 extending transversely of the web W, each blade being cocked at an angle, with respect to the plane of the web, this producing a narrow bead-type seal. By inserting the blade into the film so that the sides are relatively perpendicular to the plane of the superimposed films, a wider bead-type seal is produced. Inasmuch as each individual unit is individually supplied with electric power, strict control over the temperature of each individual blade is easily maintained. In other words, individual blades may be maintained in sharpened condition; and slight variations in the surface areas of the blades of individual knife units may be compensated for, insofar as maintaining each blade at substantially the same temperature is concerned, by using a "Variac" powerstat, or an equivalent device, for regulating the power input to each of the individual knife units.

In slitting and sealing superimposed film of polyethylene terephthalate oriented in the transverse direction, blade temperatures have been varied between 340° and 510° C. Film speeds between 85 and 160 feet/minute have been employed. In general, by varying the temperature of the blade, the angle at which the blade cuts the films, and the speed of the films, seals of various widths and degrees of strength may be made, as desired, depending upon the end use for the tubing.

The integral hot knife unit of the present invention may be fabricated from any one of many suitable metals such as aluminum, which is preferred, brass, stainless steel and sterling silver. In general, the metal should have a high thermal conductivity, a high melting point, and a high resistance to high temperature oxidation.

As stated hereinbefore, the apparatus of the present invention is highly useful for slitting and fusing the slit edges of continuous lengths of thermoplastic fabrics, either woven or non-woven. Furthermore, this apparatus may be employed to advantage in slitting of homogeneous thermoplastic films which may be difficult to slit uniformly with a cold knife or slitting means. An outstanding advantage of the present apparatus is that a multiplicity thereof may be readily assembled into a unit for slitting and sealing superimposed webs of fabric or film for the purpose of continuously fabricating continuous lengths of tubing. Any type of thermoplastic polymer, in the form of a fabric or film, may be slit or slit and fused by the apparatus of the present invention. Included among the various thermoplastic polymers are polyamides such as polyhexamethylene adipamide, polyhexamethylene sebacamide, interpolyamides such as described and claimed in United States Patent No. 2,285,009, polyesters described and claimed in United States Patent No. 2,071,250 and in 2,465,319, such as polyethylene terephthalate, various vinyl compounds such as vinyl chloride, vinyl acetate, polystyrene, and copolymers of vinyl chloride and vinyl acetate, polyethylene and derivatives and copolymers thereof, polyvinylidene chloride, rubber hydrochloride, and various natural and synthetic rubbers, such as neoprene.

We claim:

1. In an apparatus for slitting webs of thermoplastic material into a plurality of webs of lesser width comprising a bank of heated knives disposed in the path of travel of a continuous web of thermoplastic material, said bank extending transversely of said web, the improvement which comprises heated knives in said bank, each comprising in combination an elongated metal rod terminating at one end in a thin knife blade integral therewith having at least one edge substantially in alignment with the length of the rod and having a cavity open at the opposite end adapted to receive an electrical resistance heating unit, an electrical resistance heating unit housed in said cavity adjacent the blade end.

2. The apparatus of claim 1 wherein said metal is aluminum.

3. The apparatus of claim 1 wherein said knife blade is provided with two side cutting edges substantially in alignment with the length of the rod and a bottom cutting edge.

4. Apparatus of claim 1 wherein means are provided for individually controlling the temperature of each of the knives.

References Cited in the file of this patent
UNITED STATES PATENTS

| | | |
|---|---|---|
| 1,228,180 | Chandler | May 29, 1917 |
| 1,825,077 | Lawrence | Sept. 29, 1931 |
| 2,427,209 | Hagadorn | Sept. 9, 1947 |
| 2,430,496 | Dodge | Nov. 11, 1947 |
| 2,437,295 | Eastwood | Mar. 9, 1948 |
| 2,484,619 | George | Oct. 11, 1949 |
| 2,535,029 | Atanasoff et al. | Dec. 26, 1950 |
| 2,623,586 | Volpi | Dec. 30, 1952 |